United States Patent [19]

Rubrich

[11] 4,092,999
[45] June 6, 1978

[54] FLUID CONTROL VALVE

[75] Inventor: Lawrence M. Rubrich, Camden, Mich.

[73] Assignee: Dana Corporation, Toledo, Ohio

[21] Appl. No.: 790,714

[22] Filed: Apr. 25, 1977

[51] Int. Cl.² .............................................. G05D 7/01
[52] U.S. Cl. ................................... 137/504; 138/45; 251/5; 251/212; 251/DIG. 3
[58] Field of Search ................. 137/504, 843, 851; 138/45; 251/5, 212, DIG. 3

[56] References Cited

U.S. PATENT DOCUMENTS

| 2,911,997 | 11/1959 | Schramm | 251/212 X |
|---|---|---|---|
| 3,276,480 | 10/1966 | Kennedy | 138/45 |
| 3,342,215 | 9/1967 | Griffin | 251/5 X |
| 3,658,538 | 8/1972 | Sullivan | 137/504 |
| 3,724,503 | 4/1973 | Cooke | 138/45 |
| 3,958,605 | 5/1976 | Nishizu | 137/504 X |

FOREIGN PATENT DOCUMENTS 222,209  9/1924  United Kingdom ................. 138/45

Primary Examiner—Robert G. Nilson
Attorney, Agent, or Firm—Robert M. Leonardi

[57] ABSTRACT

A fluid flow control valve has a housing with axially spaced upstream and downstream portions. An axially slidable piston is received within an upstream portion of the housing and a buckleable plate brace is anchored within a downstream portion. Two axially extending buckleable plates are each affixed at one end to the piston and at the other end to the brace. Two parallel walls extend from the brace toward the piston such that opposite edges of each buckleable plate are in a generally slidable engagement with the walls and form a variable area flow path therewith. The dynamic force of the fluid flowing through the valve acts against the piston, thereby tending to buckle the plates and reduce the area of the flow path. The valve, therefore, works to automatically regulate fluid flow to a predetermined value determined by the valve geometry and the mechanical properties of the plates as they buckle.

12 Claims, 3 Drawing Figures

FLUID CONTROL VALVE

BACKGROUND OF THE INVENTION

This invention relates generally to fluid flow control valves and more particularly to fluid control valves having a variable fluid orifice.

The speed of most hydraulic motors and actuators is regulated by the rate of fluid flow through an associated hydraulic circuit. Some type of speed control is required in nearly all hydraulic motors and actuators, and fluid flow control valves are therefore widely used in hydraulic circuits.

Many such valves maintain a constant fluid flow by maintaining a constant pressure drop across a fixed orifice. This pressure drop is directly proportional to the fluid flow rate through the orifice. Maintaining a constant fluid flow rate across a fixed orifice in most hydraulic systems is difficult because of the variables associated with these systems. For example, the changing load characteristics of an associated motor or actuator may cause downstream pressure to fluctuate. Similarly, upstream pressure may fluctuate as a result of the operation of upstream system components.

Typically, fluid flow control valves monitor upstream and downstream pressure and compensate for pressure variations, thereby maintaining a constant pressure drop through the valve. Many fluid flow valves presently used in hydraulic systems compensate for pressure variations by throttling fluid flow. A typical throttling type pressure compensated flow control valve includes a fixed metering orifice and a coil spring biased piston or spool. Fluid pressure upstream and downstream of the metering orifice is vented to opposing surfaces of the balanced spool. Fluid flow is throttled as the piston moves in response to pressure variations at the opposing surfaces.

It is desirable in spool valves to have a constant spring biasing force acting on the spool at all operating positions. However, coil spring biased spool valves have inherent efficiency problems because of spring inaccuracies. Spring forces do not remain truly constant as the spring is stretched or compressed. Attempts have been made to compensate for these spring inaccuracies. For example, additional surface areas may be provided on the spool for exposure to pressurized fluid when the spool has been displaced a predetermined amount. However, such compensation methods themselves are often inaccurate and can unnecessarily complicate the valve manufacturing process.

SUMMARY OF THE INVENTION

It is an object of the present invention to provide a variable orifice fluid flow control valve utilizing deformable body mechanics to provide a simple, effective and relatively small valve.

This and other objects of the present invention which are apparent from the following detailed description are achieved by a fluid flow control valve comprising a housing having an axially extending fluid passageway therethrough and an axially slidable piston received within the housing. A buckleable plate is affixed to the piston and extends axially downstream from the piston through the housing. The buckleable plate is affixed to the housing at a location axially spaced downstream from the piston by means such as a brace which is rigidly affixed to the housing. Axial movement of the piston as a result of fluid pressure variations affects the degree of buckling of the plate. The piston and brace may each have axially extending fluid apertures therethrough. A second buckleable plate may also extend between the piston and brace such that both plates are buckleable toward each other when the piston is moved toward the brace. The brace may include spaced parallel walls in sliding engagement with the axially extending edges of the plates.

DETAILED DESCRIPTION OF A PRESENTLY PREFERRED EMBODIMENT

Figure 1:
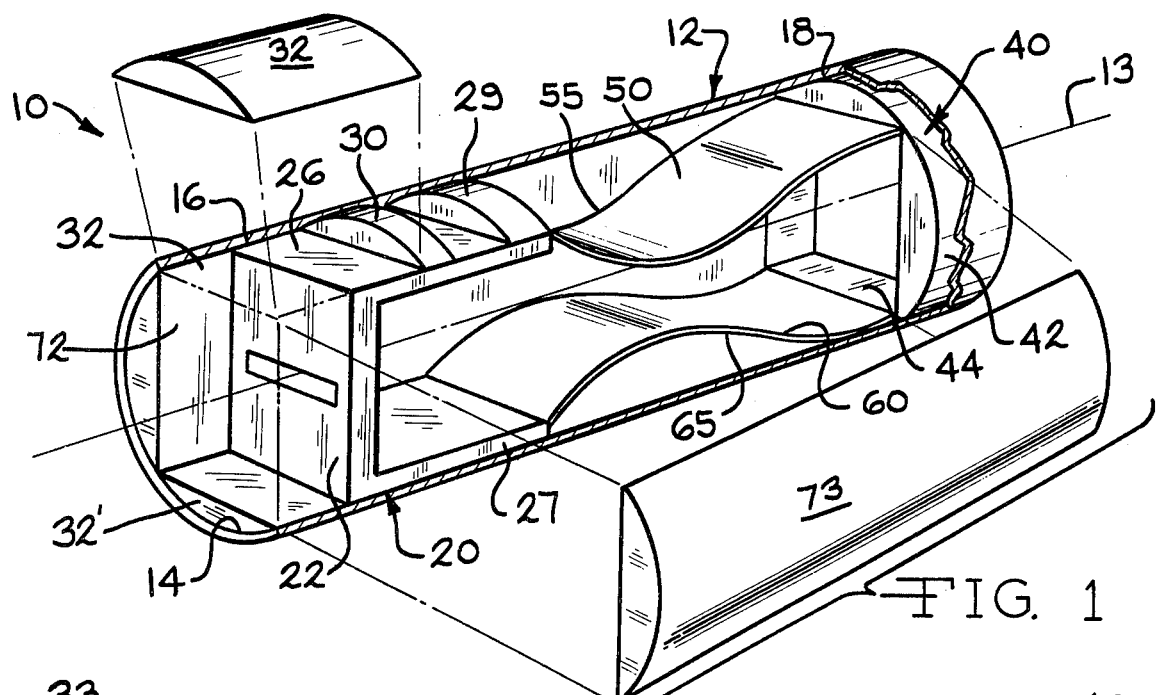
FIG. 1 is an exploded isometric view of a fluid flow control valve of the present invention with a portion of the housing being broken away.
Figure 2:
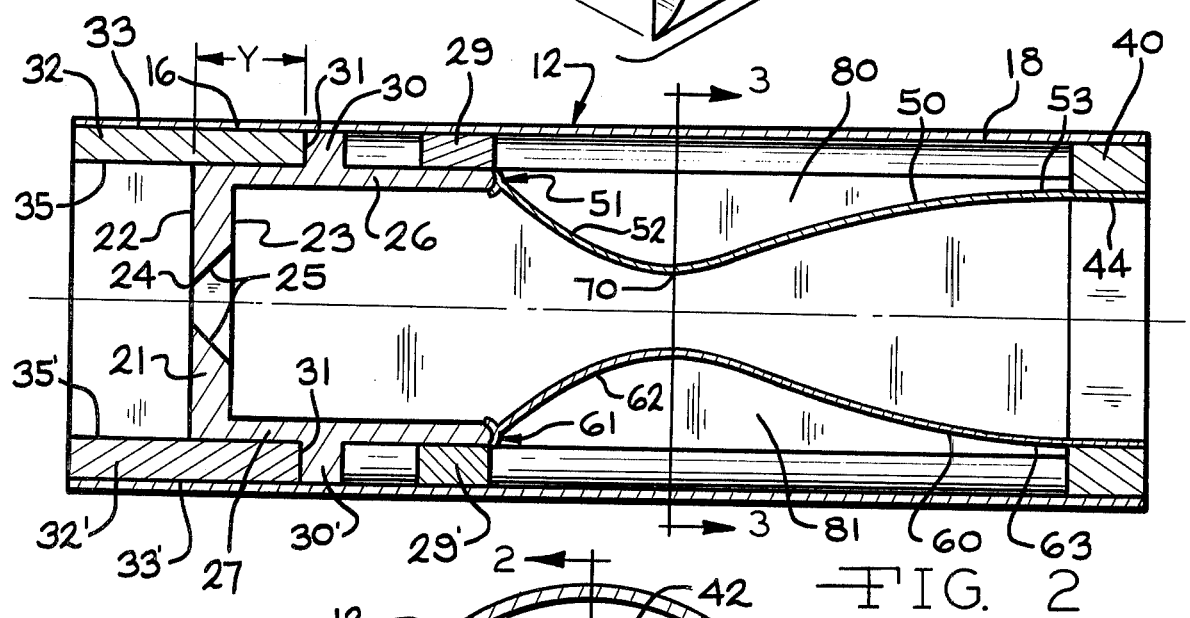
FIG. 2 is a cross-sectional side view of the valve of FIG. 1 taken through line 2—2 of FIG. 3.

Referring to FIGS. 1 and 2, a valve 10 of the present invention comprises a hollow cylindrical housing 12 having an inside surface 14 and a longitudinally extending axis 13. A cylindrical fluid passageway extends axially through the housing 12 from an upstream location 16 to a downstream location 18. The housing is adapted to be inserted in a fluid line of a hydraulic circuit by means such as couplings which are well known in the art.

An axially slidable piston 20 is received within the upstream portion 16 of the housing 12. Generally, the piston 20 comprises a rigid U-shaped member having a face component 21 substantially perpendicular to the housing axis 13 and two spaced and parallel axially extending legs 26 and 27. The face component 21 has a first flat and generally square surface 22 for exposure to upstream fluid and second flat and generally rectangular surface 23 opposite said first surface for exposure to downstream fluid. The area of the second surface 23 is smaller than that of the first surface 22 by an amount equal to the cross-sectional area of both of the piston legs 26 and 27. The piston is thereby biased in the downstream direction when there is equal pressure on both sides of the piston.

The face component 21 contains a generally rectangular fixed aperture 24 extending axially therethrough. The surface 23 for exposure to downstream fluid pressure includes two diagonally extending surfaces 25 which intersect with the first surface 22 to form a knife edge aperture 24. The tapered or knife edge configuration of aperture 24 is preferred because of its more precise and predictable performance as a flow orifice as is known in the art.

Rigidly attached to the radially outer surface of each leg 26 and 27 of the piston 20 are two radially outwardly projecting ribs 29 and 30, and 29' and 30', respectively. Each rib has a radially outer surface which conforms to and is in a sealing, sliding engagement with the inside surface 14 of the housing 12. The downstream ribs 29 and 29' are primarily for sealing purposes while the upstream ribs 30 and 30' serve primarily as a means for limiting upstream movement of the piston 20 beyond a predetermined location. The upstream ribs 30 and 30' are axially disposed at about the middle of their respective piston legs 26 and 27 at a distance Y from the upstream surface 22.

Bumpers 32 and 32' are rigidly affixed to the housing 12 adjacent the upstream portion 16 and have downstream surfaces 31 against which the members 30 and 30' "bottom out" when the piston 20 reaches its extreme axially upstream position. The radially outer surfaces 33 and 33' of the bumpers 32 and 32' are contoured to form a fluid-tight seal with the associated inner housing surface 14. Each bumper 32 and 32' has a flat radially inner surface 35 and 35', respectively, which is sealingly and slidingly engaged with the outer surface of its associated piston leg 26 or 27. The bumpers 32 and 32' are substantially identical and have a cross-section substantially identical to that of each of the ribs 29, 29', 30 and 30'. When the piston 20 is in its extreme upstream position as most clearly seen in FIG. 2, the bumpers 32 and 32' extend axially from the upstream ribs 30 and 30' beyond the upstream exposed surface 22 of the piston.

It can be seen that the piston 20 can be axially moved downstream a distance Y before the upstream ribs 30 and 30' are exposed to upstream fluid pressure. In most applications, it will be desirable to design the valve 10 to assure that the piston is limited to axial sliding a distance less than Y. However, in some applications it may be desirable to provide additional upstream exposed surfaces after a predetermined axial movement of the piston 20. The valve 10 may be designed such that movement of the piston 20 a predetermined axial distance greater than Y is possible, in which case the additional surfaces of the ribs 30 and 30' are exposed to upstream fluid pressure.

A brace 40 is axially spaced downstream from the piston 20 and is rigidly affixed, such as by welding, to the downstream portion 18 of the valve housing 12. The brace 40 has an annular outer surface 42 sealingly engaged with the inner surface 14 of the housing 12. A square aperture extends axially through the brace 40 and provides a passageway for regulated fluid.

First and second resiliently buckleable plates 50 and 60 extend generally axially between the piston 20 and the brace 40. Each buckle plate 50 and 60 has a generally rectangular configuration and a predetermined width, length and thickness. An upstream end portion 52 and 62 of each buckle plate 50 and 60, respectively, is affixed to an end of a piston leg 26 or 27, respectively. A support assembly 51 having a ball and socket type connection provides a "simple" support of each buckle plate at its upstream end 52 or 62 (i.e., a support only against axial movement of the valve without substantial restraint against lateral or radial movement thereof). This "simple" end support method is adapted to promote buckling of the buckleable plates 50 and 60 as will hereinafter be described.

The downstream portions 53 and 63 of the buckle plates 50 and 60 are rigidly affixed to the upstream surface of the brace 40, as for example by welding, on laterally opposite sides of the square aperture 44. The rigid attachment of the buckle plates to the brace 40 increases stiffness and therefore reduces buckling of the plates near their downstream ends 53 and 63. It should be understood that the means of affixing the ends of the buckleable plates 50 and 60 to the piston and the brace will have a major effect on the buckling characteristics of the plates. Choice of these methods must be made in view of the particular operating requirements of the valve and in view of the other parameters involved in the valve design.

Rigidly affixed to the brace 30 and extending axially upstream toward the piston 20 are two wall members 72 and 73. The wall members have parallel walls 74 and 75 which are spaced apart a distance W (see FIG. 3) approximately equal to the width of each buckle plate 50 and 60. The radially outer surfaces of the wall members 72 and 73 are contoured to sealingly engage the inner surface 14 of the valve housing 12. The wall members 72 and 73 extend beyond the upstream surface 22 of the piston and are in sliding engagement with the edges of the piston legs 26 and 27 and face component 21.

Figure 3:
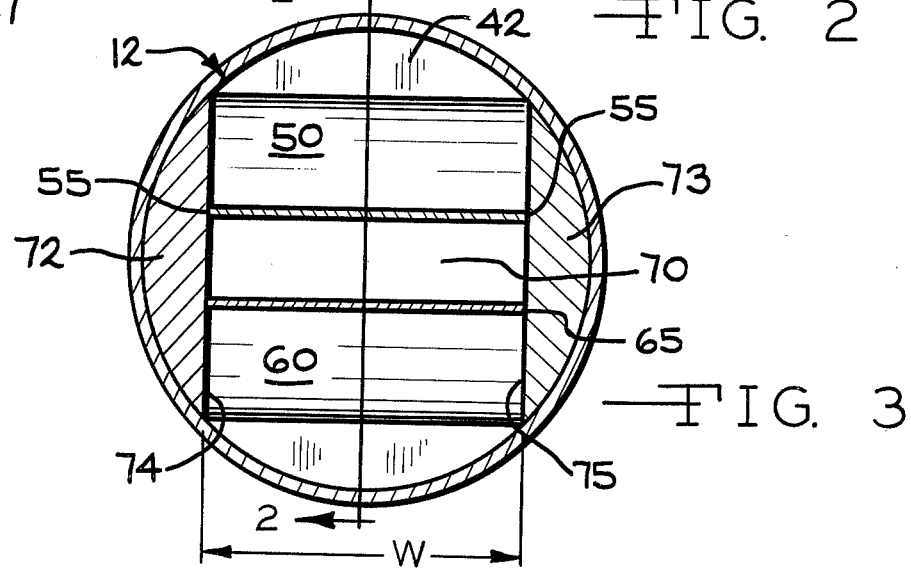
FIG. 3 is a cross-sectional end view of the valve of FIG. 1 taken through line 3—3 of FIG. 2.

As is most clearly seen in FIG. 3, the edges 55 and 65 of the buckle plates 50 and 60, respectively, are in a generally sliding contact with each of the walls 72 and 73. A variable fluid orifice 70 is thereby formed between the plates 50 and 60 and the walls 74 and 75. An upper damping cavity 80 is formed between the first buckle plate 50, the walls 74 and 75 and the inner surface 14 of valve housing. A lower damping cavity 81 is similarly formed utilizing the second plate 60 as a boundary.

A buckling of the plates 50 and 60 changes the volume of the damping cavities 80 and 81. Fluid communication between the fluid mainstream and the cavities 80 and 81 is provided through gaps between the buckle plate edges 55 and 65 and the walls 74 and 75. Gap size generally determines the rate at which pressurized fluid may leak in or out of the cavities 80 and 81, which in turn is determinative of the valve damping factor. Small gaps stabilize the plates 50 and 60 and therefore increase the damping factor by allowing the valve to ignore instantaneous peaks of fluid pressure. However, large gaps reduce the pressure drop through the valve, which reduces valve accuracy. Larger gaps increase sensitivity of the valve, thereby decreasing the damping factor. The valve may be designed such that its damping factor produces the appropriate sensitivity and accuracy for the particular intended use.

For a thorough understanding of the operation of the valve of the present invention it is necessary to understand the mechanics of deformable bodies such as plates or columns. In theory, an ideal column axially loaded its Euler or "critical buckling load" begins to buckle and continues to buckle with no increase in load. In other words, the force required to buckle a column or plate remains constant regardless of the degree of buckling which has previously occurred. Therefore, the column or plate acts as a spring with a constant spring force.

The Euler or critical buckling load for a plate such as 50 or 60 is proportional to the moment of inertia, modulus of elasticity, and end constraints of the plates. The moment of inertia is dependent upon the length, width and thickness of the plate while the modulous of elasticity is dependent primarily upon the material of which the plates are constructed. Regarding end constraints, a plate with both ends rigidly supported (as for example, the downstream ends 53 and 63 of the plates 50 and 60) has a critical buckling load of about 4 times that of a plate having both ends simply supported (as, for example, the upstream ends 52 and 62 of the plates 50 and 60). A plate having one end simply supported and one end rigidly supported (as described in the presently preferred embodiment and illustrated in FIGS. 1, 2 and 3) has a critical buckling load of about 2.04 times that of a plate with both ends simply supported. These end constraint factors are valid when the width to length ratio of the plate is less than 0.1 inches. A greater width will increase the stiffness of the plate.

It can therefore be seen that the critical buckling load, and therefore the "spring" force opposing axial downstream movement of the piston 20, must be designed with several factors taken into account. The critical buckling load must also be coordinated with the initial size of the variable orifice 70 and the desired range of sizes of the orifice 70. For example, the length of the plates 50 and 60 not only determine the spring force applied by the plates, but also determine the rate at which the orifice 70 varies per each incremental length of axial movement of the piston 20. Therefore, relatively short plates 50 and 60 will produce a relatively large critical buckling load, but axial movement of the piston 20 a short distance will create a relatively large variation in the orifice 70. Methods and formulas for designing buckleable plates or columns for a particular application are well known and therefore will not be discussed herein.

In the valve of the present invention, the bumpers 32 and 32' are positioned such that the buckleable plates 50 and 60 are always buckled to some degree. That is, the distance between the axially downstream ends of the piston legs 26 and 27 and the upstream surface of the brace 40 is always less than the length of the plates 50 and 60. Under load, the plates deform or buckle toward each other, i.e., toward the housing axis 13. The size of the variable orifice 70 therefore decreases as the piston 20 is forced downstream. The extreme axially upstream or "bottomed out" position of the piston 20, and therefore the size of the orifice 70, can be predetermined by the axial positioning of the bumpers 32 and 32'. The maximum size of the variable orifice 70 (as shown in FIG. 2) is preferably larger than the anticipated operating size required. During operation of the valve, the size of the orifice 70 is reduced, as will hereafter be described, and the piston is movable in either an upstream or a downstream direction.

The valve 10 may be utilized in a hydraulic circuit which, in one mode, actuates a device such as a hydraulic motor as a constant speed. Initially, the buckle plates 50 and 60 maintain the piston 20 in its extreme upstream position. For actuation of the pump, fluid such as oil is passed through the valve 10. The variable orifice 70 is initially in its fully open position and therefore permits maximum fluid flow until it is determined that the flow must be restricted. Upon an initial fluid flow through the valve, fluid pressure upstream of the fixed orifice 24 acts on the upstream piston surface 22 while there is little fluid pressure downstream of the fixed orifice 24 acting on the opposing downstream surface 23. If the net downstream force on the piston exceeds the total critical buckling load of the buckle plates 50 and 60 the piston is forced in a downstream direction until an equalibrium position is attained. As the piston 20 moves toward the brace 40, the size of the variable orifice 70 is decreased. Fluid flow is therefore restricted and a back pressure builds up against the downstream piston surface 23, allowing equalibrium to be reached. At the equalibrium position a constant fluid pressure drop occurs across the fixed orifice 24 and a constant fluid flow rate is therefore achieved.

During actuation of the motor, if upstream fluid pressure decreases the piston 20 is biased in the upstream direction, thereby partially unbuckling the plates 50 and 60 and enlarging the variable orifice 70. The enlarged orifice 70 decreases the fluid pressure on the downstream side of the piston 20 and maintains a constant pressure across the fixed orifice 24. If the system or load causes the downstream pressure to decrease, the piston 20 is biased in the downstream direction, thereby buckling the plates and reducing the size of the variable orifice 70. Under all operating conditions the pressure across the fixed orifice 24 and therefore the fluid flow rate are maintained constant.

Reverse or return flow through the hydraulic circuit may be accomplished through the valve of the present invention without the necessity of utilizing a check valve or other fluid flow control valve bypass. The valve 10 of the present invention permits a maximum return flow because the piston is biased to its extreme leftward position as viewed in FIG. 2, thereby opening the variable orifice 70 to its maximum size.

It has been seen that a valve of the present invention may be designed to have specific characteristics desirable for a number of particular hydraulic systems. For example, if the particular system is likely to encounter several intermittent and extreme pressure variations, a higher damping factor may be produced by decreasing the gap between the buckle plates and the side walls. For applications where high fluid pressures are encountered the critical buckling load of the plates can be increased by rigidly affixing the plate ends, shortening, widening or thickening the plates, or utilizing stronger materials such as steel or other metals.

Although the foregoing structure has been described for the purpose of illustrating a presently preferred embodiment of the invention, it should be understood that many modifications or alterations may be made without departing from the spirit and the scope of the invention as set forth in the appended claims.

I claim:

1. A fluid flow control valve comprising:
   a housing having a fluid passageway extending axially therethrough from an upstream location to a downstream location;
   an axially slidable piston received within said housing, said piston having a first surface for exposure to upstream fluid and a second surface for exposure to downstream fluid;
   a first buckleable plate affixed to said piston and extending downstream therefrom; and
   means for affixing said first buckleable plate to said housing at a location downstream of said piston,
   whereby axial movement of said piston is affected by fluid flow through said valve and therefore affects the degree of buckling of said first buckleable plate which in turn stabilizes fluid flow through said valve.

2. A fluid flow control valve as defined in claim 1 wherein said first buckleable plate is resiliently buckleable.

3. A fluid flow control valve as defined in claim 1 wherein said first buckleable plate is simply supportingly affixed to said piston and rigidly supportingly affixed to said housing.

4. A fluid flow control valve as defined in claim 1 further comprising means for limiting axial movement of said piston in an upstream direction.

5. A fluid flow control valve as defined in claim 1 further comprising a second buckleable plate affixed to said piston and extending downstream therefrom, and means for affixing said second buckleable plate to said housing at a location downstream of said piston.

6. A fluid flow control valve as defined in claim 5 wherein said first and second buckleable plates are buckleable toward each other when said piston is axially moved in a downstream direction.

7. A fluid flow control valve as defined in claim 6 wherein said piston comprises a generally rectangular and knife edged fluid aperture extending generally axially therethrough and wherein said first and said second buckleable plates are affixed to said piston on laterally opposite sides of said aperture.

8. A fluid flow control valve as defined in claim 7 wherein said means for affixing said first and second buckleable plates comprises a brace axially spaced downstream from said piston and anchored within and in a generally sealing engagement with said housing, said brace defining a generally axially extending and rectangular shaped aperture, wherein said first and second buckleable plates are affixed to said brace adjacent laterally opposite sides of said brace aperture.

9. A fluid flow control valve as defined in claim 5 wherein said means for affixing said first and second buckleable plates comprises a brace axially spaced downstream of said piston, said valve further comprising two spaced and generally parallel walls extending from said brace in an upstream direction.

10. A fluid flow control valve as defined in claim 9 wherein said first and second buckleable plates are substantially rectangular and identical, and wherein the width of said plates is approximately equal to the distance between said two parallel walls, and wherein two opposite edges of each of said first and second buckleable plates are in a generally slidable engagement with said two parallel walls, whereby a variable area fluid orifice if formed between said plates and said walls.

11. A fluid flow control valve as defined in claim 10 further comprising a pressure damping cavity between each of said first and second buckleable plates and said housing, said cavities in a leaking fluid communication with said fluid passageway.

12. A fluid flow control valve as defined in claim 11 wherein said first and second buckleable plates are metal and wherein said housing has a generally cylindrical inside surface and wherein each of said piston and said brace have generally cylindrical shaped outer portions.

* * * * *